United States Patent
Weaver et al.

[11] Patent Number: 6,138,147
[45] Date of Patent: Oct. 24, 2000

[54] METHOD AND APPARATUS FOR IMPLEMENTING SEAMLESS PLAYBACK OF CONTINUOUS MEDIA FEEDS

[75] Inventors: Daniel Weaver, Redwood City; David J. Pawson, Palo Alto, both of Calif.

[73] Assignee: Oracle Corporation, Redwood Shores, Calif.

[21] Appl. No.: 08/956,262

[22] Filed: Oct. 22, 1997

Related U.S. Application Data

[63] Continuation-in-part of application No. 08/859,860, May 21, 1997, Pat. No. 5,864,682, which is a continuation of application No. 08/502,480, Jul. 14, 1995, Pat. No. 5,659,539.

[51] Int. Cl.[7] .......................... G06F 13/372; H04M 11/00
[52] U.S. Cl. .......................... 709/206; 709/236; 709/203; 707/104
[58] Field of Search .................................. 709/203, 206, 709/236; 707/104

[56] References Cited

U.S. PATENT DOCUMENTS

| | | | |
|---|---|---|---|
| 5,465,120 | 11/1995 | Schulthesis . | |
| 5,559,999 | 9/1996 | Maturi et al. . | |
| 5,568,180 | 10/1996 | Okamoto | 348/7 |
| 5,629,732 | 5/1997 | Moskowitz et al. | 348/7 |
| 5,659,539 | 8/1997 | Porter et al. | 709/231 |
| 5,790,176 | 8/1998 | Craig | 348/13 |
| 5,818,512 | 10/1998 | Fuller | 348/8 |
| 5,826,024 | 10/1998 | Higashimura et al. | 709/214 |

FOREIGN PATENT DOCUMENTS

| | | |
|---|---|---|
| 0748122A2 | 12/1996 | European Pat. Off. . |
| WO 91/13695 | 9/1991 | WIPO . |
| WO 98/00973 | 1/1998 | WIPO . |

*Primary Examiner*—Krisna Lim
*Attorney, Agent, or Firm*—McDermott, Will & Emery

[57] ABSTRACT

A method and system for storing a continuous feed of video is provided. According to one aspect of the invention, the continuous feed is encoded in a digital video format to produce a digital data stream. A series of content files is created by repeatedly performing the steps of (1) storing the digital data stream in a current file, and (2) establishing a new file as the current file when the current file satisfies a predetermined condition. If the series of content files contains more than a predetermined amount of the continuous feed, the oldest content file in the series of content files is deleted. Tag information that indicates information about frames contained in the digital data stream is generated. The tag information includes timestamps that indicate timing of frames relative to a beginning of the digital data stream. An initial time value that indicates an absolute time that corresponds to the beginning of the digital data stream. When a request from a client for playback beginning at a specified absolute time is received, the initial time value is subtracted from the specified absolute time to determine a relative time. The tag information is used to identify a location in the digital data stream that corresponds to the relative time. The digital data stream is then transmitted to the client beginning at the location in the digital data stream that corresponds to the relative time.

20 Claims, 8 Drawing Sheets

METHOD AND APPARATUS FOR IMPLEMENTING SEAMLESS PLAYBACK OF CONTINUOUS MEDIA FEEDS

RELATED APPLICATIONS

This application is a continuation-in-part of U.S. patent application Ser. No. 08/859,860 which was filed on May 21, 1997 and issued as U.S. Pat. No. 5,864,682 on Jan. 26, 1999, and which is a continuation of U.S. Patent Application Ser. No. 08/502,480 which was filed July 14, 1995 and issued as U.S. Pat. No. 5,659,539 on Aug. 19, 1997.

The present application is related to: U.S. patent application Ser. No. 08/956,261, entitled "METHOD AND APPARATUS FOR CONCURRENTLY ENCODING AND TAGGING MEDIA" filed by Daniel Weaver, Mark A. Porter and David J. Pawson", on the equal day herewith, the contents of which are incorporated herein by reference.

U.S. patent application Ser. No. 08/956,263, entitled "METHOD AND APPARATUS FOR NON-SEQUENTIAL ACCESS TO AN IN-PROGRESS VIDEO FEED" filed by Daniel Weaver, Mark A. Porter and David J. Pawson ", on the equal day herewith, the contents of which are incorporated herein by reference.

FIELD OF THE INVENTION

The present invention relates to a method and apparatus for processing audio-visual information, and more specifically, to a method and apparatus for providing non-sequential access to audio-visual information represented in a live content stream.

BACKGROUND OF THE INVENTION

In recent years, the media industry has expanded its horizons beyond traditional analog technologies. Audio, photographs, and even feature films are now being recorded or converted into digital formats. To encourage compatibility between products, standard formats have been developed in many of the media categories.

As would be expected, the viewers of digital video desire the same functionality from the providers of digital video as they now enjoy while watching analog video tapes on video cassette recorders. For example, viewers want to be able to make the video jump ahead, jump back, fast forward, fast rewind, slow forward, slow rewind and freeze frame.

Various approaches have been developed to provide non-sequential playback of digital video data. With respect to digital video data, non-sequential playback refers to any playback operation that does not play all of the encoded frames in the exact order in the sequence in which they were encoded. For example, jump ahead and fast forward operations are non-sequential in that some frames are skipped. Rewind operations at any speed are non-sequential in that during a rewind operation, frames are not played in the sequence in which they are encoded.

One approach to providing non-sequential playback of digital video data, referred to herein as the tag-based approach, is described in U.S. Pat. No. 5,659,539, entitled "Method and Apparatus for Frame Accurate Access of Digital Audio-visual Information" issued to Porter et al on Aug. 19, 1997, the contents of which are incorporated herein by this reference. According to the tag-based approach, a stored digital video file is parsed to generate "tag information" about individual frames within the file.

Specifically, the tag file contains information about the state of one or more state machines that are used to decode the digital representation. The state information varies depending on the specific technique used to encode the audio-visual work. For MPEG-2 files, for example, the tag file includes information about the state of the program elementary stream state machine, the video state machine, and the transport layer state machine.

During the performance of the audio-visual work, data from the digital representation is sent from a video pump to a decoder. The information in the tag file is used to perform seek, fast forward, fast rewind, slow forward and slow rewind operations during the performance of the audio-visual work. Seek operations are performed by causing the video pump to stop transmitting data from the current position in the digital representation, and to start transmitting data from a new position in the digital representation. The information in the tag file is inspected to determine the new position from which to start transmitting data. To ensure that the data stream transmitted by the video pump maintains compliance with the applicable video format, prefix data that includes appropriate header information is transmitted by the video pump prior to transmitting data from the new position.

Fast forward, fast rewind, slow forward and slow rewind operations are performed by selecting video frames based on the information contained in the tag file and the desired presentation rate, and generating a data stream containing data that represents the selected video frames. The selection process takes into account a variety of factors, including the data transfer rate of the channel on which the data is to be sent, the frame type of the frames, a minimum padding rate, and the possibility of a buffer overflow on the decoder. Prefix and suffix data are inserted into the transmitted data stream before and after the data for each frame in order to maintain compliance with the data stream format expected by the decoder.

The tag-based approach works well when there is enough time between the creation of the original digital video stream and the viewing of the digital video stream to allow the original digital video stream to be parsed to generate tag information. However, when the digital video stream is being viewed as it is being generated, parsing the digital video stream becomes impractical. The amount of computational power required to parse the digital video stream as it arrives would be prohibitively expensive. On the other hand, it is not considered acceptable to increase the latency between the occurrence of many types of video feeds (e.g. sporting events) and the time at which such feeds are available for audience viewing.

When a video stream is made available for viewing before generation of the stream has been completed, the video stream is said to be a "live feed". At a professional level, non-linear digital editors can be used to rapidly review footage of a live feed for a single user. However, these systems are not intended for and cannot be easily adapted to serve many users. For example, if a hundred users were watching the same live feed but wanted to rewind, pause, and fast forward the feed at different times, each would require a separate non-linear digital editor.

Another problem associated with providing non-linear access to live digital video streams is that users may attempt to fast forward into portions of the video stream that do not yet exist. For example, a viewer may attempt to fast forward a live feed to see the final score of game which, in reality, has not yet ended. It is desirable to provide techniques for handling these types of situations in a way that ensures that the decoder will not freeze nor the video stream become corrupted.

Based on the foregoing, it is clearly desirable to provide a method and apparatus for sequentially displaying non-sequential frames of a live digital video. It is further desirable to provide such non-sequential access to live digital video in a way that does not require each viewer to operate prohibitively expensive hardware. It is also desirable to provide safeguards against attempts to access portions of a live digital video stream that do not yet exist.

SUMMARY OF THE INVENTION

A method and system for storing a continuous feed of video is provided. According to one aspect of the invention, the continuous feed is encoded in a digital video format to produce a digital data stream. A series of content files is created by repeatedly performing the steps of (1) storing the digital data stream in a current file, and (2) establishing a new file as the current file when the current file satisfies a predetermined condition. If the series of content files contains more than a predetermined amount of the continuous feed, the oldest content file in the series of content files is deleted.

According to another aspect of the invention, the deletion of the oldest content file may be delayed if it is currently being accessed. The deletion may be delayed until the oldest content file is no longer accessed, or until a certain amount of time has passed since the time at which it would have been deleted but for the fact that it was being accessed.

According to another aspect of the invention, tag information that indicates information about frames contained in the digital data stream is generated. The tag information includes timestamps that indicate timing of frames relative to a beginning of the digital data stream. An initial time value that indicates an absolute time that corresponds to the beginning of the digital data stream.

When a request from a client for playback beginning at a specified absolute time is received, the initial time value is subtracted from the specified absolute time to determine a relative time. The tag information is used to identify a location in the digital data stream that corresponds to the relative time. The digital data stream is then transmitted to the client beginning at the location in the digital data stream that corresponds to the relative time.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for providing non-sequential access to a live digital video stream is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

FUNCTIONAL OVERVIEW

According to one aspect of the invention, the difficulty associated with applying the tag-based approach to live digital video feeds is addressed by eliminating the need to parse an incoming digital video stream in real time. Instead of generating tag data by parsing the digital video stream, the unit responsible for encoding the live feed retains information about how the data was encoded and transmits that information to the video server along with the encoded data. The tag information arrives at the video server along with the corresponding content, so the content itself does not have to be parsed.

According to another aspect of the invention, the video server is configured to ensure that the client cannot seek or scan past the end of the received content. Due to the fact that there will be some amount of skew between the arrival time of the content and the corresponding tags, the server is configured to make sure that tags are not used prematurely, i.e. such that they would cause the server to go past the end of the available content.

EXEMPLARY SYSTEM

Figure 1:
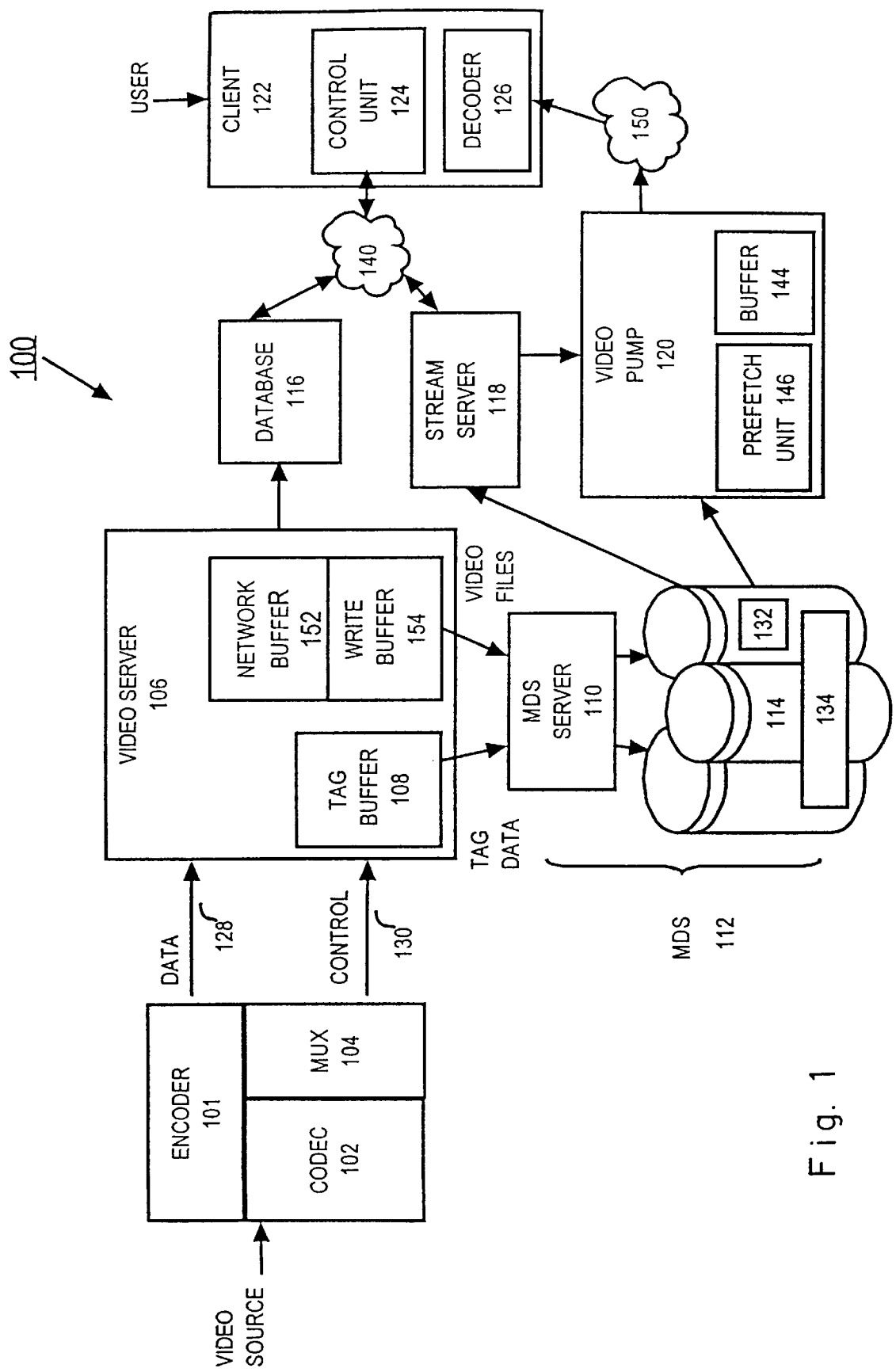
FIG. 1 is a block diagram that illustrated a video delivery system according to an embodiment of the invention.

FIG. 1 is a block diagram illustrating an exemplary audio-visual information delivery system 100 for delivering and providing non-sequential access to live digital video feeds. Audio-visual information delivery system 100 generally includes an encoder 101, a video server 106, a Media Data Store (MDS) 112, a database 116, a stream server 118, a video pump 120, and a client 122.

THE ENCODER

Encoder 101 receives audio visual input and generates a digital stream of data that encodes the audio visual input according to a particular format. Numerous video encoding formats have been developed and are well known in the industry. For example, the MPEG formats are described in detail in the following international standards: ISO/IEC 13818-1, 2, 3 (MPEG-2) and ISO/IEC 11172-1, 2, 3 (MPEG-1). Documents that describe these standards (hereafter referred to as the "MPEG specifications") are available from ISO/IEC Copyright Office Case Postale 56, CH 1211, Geneve 20, Switzerland. While specific formats may be referenced herein for the purposes of explanation, the present invention is not restricted to any particular digital stream format.

Encoder 101 includes a Coder/Decoder (CODEC) 102 and a multiplexer (MUX) 104. CODEC 102 converts visual or audio-visual information from an input source to compressed digital data. CODEC 102 may be, for example, a fractal compressor or an MPEG compressor. For the purposes of illustration, it shall be assumed that the video source being captured by CODEC 102 is a live source and, consequently, CODEC 102 is encoding video at IX relative to real time. However, the video source may alternatively be a stored video source which CODEC 102 encodes at any rate relative to real time.

MUX 104 multiplexes the compressed audio and visual information generated by CODEC 102 to generate a compressed video stream. In the compressed video stream, the data representing video frames and audio are merged and formatted according to the particular digital format supported by encoder 101. The specific operations performed during the merging process will vary based on the type of encoding employed. For example, the merging process may involve determining the order and placement of portions of digitized audio and video in the stream and inserting metadata at various points within the stream. The metadata may take the form, for example, of header information that identifies the starting point and content of "packets" within the stream. The stream of compressed audiovisual information constructed by MUX 104 is transmitted from the encoder 101 to the video server 106 over a communication channel 128.

CONTROL INFORMATION

According to one aspect of the invention, the encoder 101 sends control information to the video server 106 over a communication channel 130 in parallel with the video stream. The control information sent over channel 130 includes specific information about how the encoder 101 constructed the video stream. This control information includes tag data that will be used by the stream server 118 to provide non-sequential access to the video stream. Specifically, the control information may include information about the type, length, and boundaries of the various frames encoded in the video stream as well as header information that specifies the compression ratio, the bit rate, and other types of information the video server 106 requires to determine how to process the video stream.

Significantly, the generation of the control information involves minimal additional computational power because MUX 104 generates most of the information already during the construction of the content stream. Specifically, MUX 104 arranges and encapsulates the digital video and audio data from CODEC 102. Since MUX 104 is packaging the content, MUX 104 knows the contents of and boundaries between the packages.

COMMUNICATION BETWEEN THE ENCODER AND THE VIDEO SERVER

While CODEC 102 will typically be implemented in hard-wired circuitry, MUX 104 is preferably implemented by program-controlled circuitry, such as a processor programmed to execute a particular sequence of instructions that are stored in a memory. Consequently, MUX 104 may include a processor executing a conventional multiplexing program that has been linked with and makes calls to a software library that controls the communication with the video server 106.

All data transmitted between the encoder 101 and the video server 106 is preferably sent using a reliable communication mechanism. According to one embodiment, the video content on communication channel 128 is handled as a simple bytestream and is transmitted via a lightweight, reliable protocol. For example, TCP is sufficient on lightly loaded networks. The control information and metadata on communication channel 130 contain more complicated data types and are sent via an object oriented protocol, such as the Common Object Resource Broker Architecture Interface Definition Language ("CORBA IDL").

Communication between the encoder 101 and the video server 106 occurs in sessions. According to one embodiment, a session is performed in three phases: OPEN, SEND and CLOSE. The operations performed during each of the phases is as follows:

OPEN—any provisioning that the video server 106 needs to perform for network or disk bandwidth or disk space occurs. A pipe for the video stream data (the "content") is created.

SEND TAGS and SEND DATA—these calls are made multiple times as content is encoded. The video server 106 stores all content immediately to disk and updates an end-of-file position. Tags are held in memory until the accompanying content data has been stored. Tags are held for an additional period of time to guarantee that a seek to that tag will succeed, i.e. that video pump 120 will not starve for data.

CLOSE—content pipe is torn down. Server resources are released and content services and clients are notified that the feed has become a normal static piece of content.

Encoder 101 generates content data and control data in parallel. However, the control data associated with a particular portion of content is not necessarily generated by encoder 101 at the same time as the particular portion of content. For example, encoder 101 may actually determine how it is going to line up content frames before the encoder 101 actually lines up the frames. Under these circumstances, the control data that indicates how the frames are lined up may be transmitted by encoder 101 before the content data that contains the frames.

THE VIDEO SERVER

Video server 106 receives the video stream and control data from encoder 101 and causes the data to be stored in MDS 112. In the illustrated system, the video server 106 sends an MPEG video stream to MDS server 110, and MDS server 110 stores the MPEG video stream in an MPEG file 134. In parallel, the video server 106 sends to the MDS server 110 tag information extracted from the control data received on line 130. The tag data is stored in a tag file 132 on disks 114. The video server 106 may also send information about the content, including tag data, to be stored in database 116.

Once tag data is transmitted by video server 106, any other entity in the system, including video pump 120, may use the tag data to attempt to access the content associated with the tag data. Consequently, the immediate transmission of tag data to MDS server 110 may result in errors when, for example, the tag data arrives at video server 106 before the corresponding content data. Therefore, prior to sending the tag data to MDS server 110, video server 106 buffers each tag data item in a tag buffer 108 until it is safe for entities, such as video pump 120, to access the content associated with the tag data item. The use of tag buffer 108 to avoid premature reads of content data is described in greater detail hereafter.

EXEMPLARY MPEG FILE

Digital audio-visual storage formats, whether compressed or not, use state machines and packets of various structures.

The techniques described herein apply to all such storage formats. While the present invention is not limited to any particular digital audio-visual format, the MPEG-2 transport file structure shall be described for the purposes of illustration.

Figure 2A:
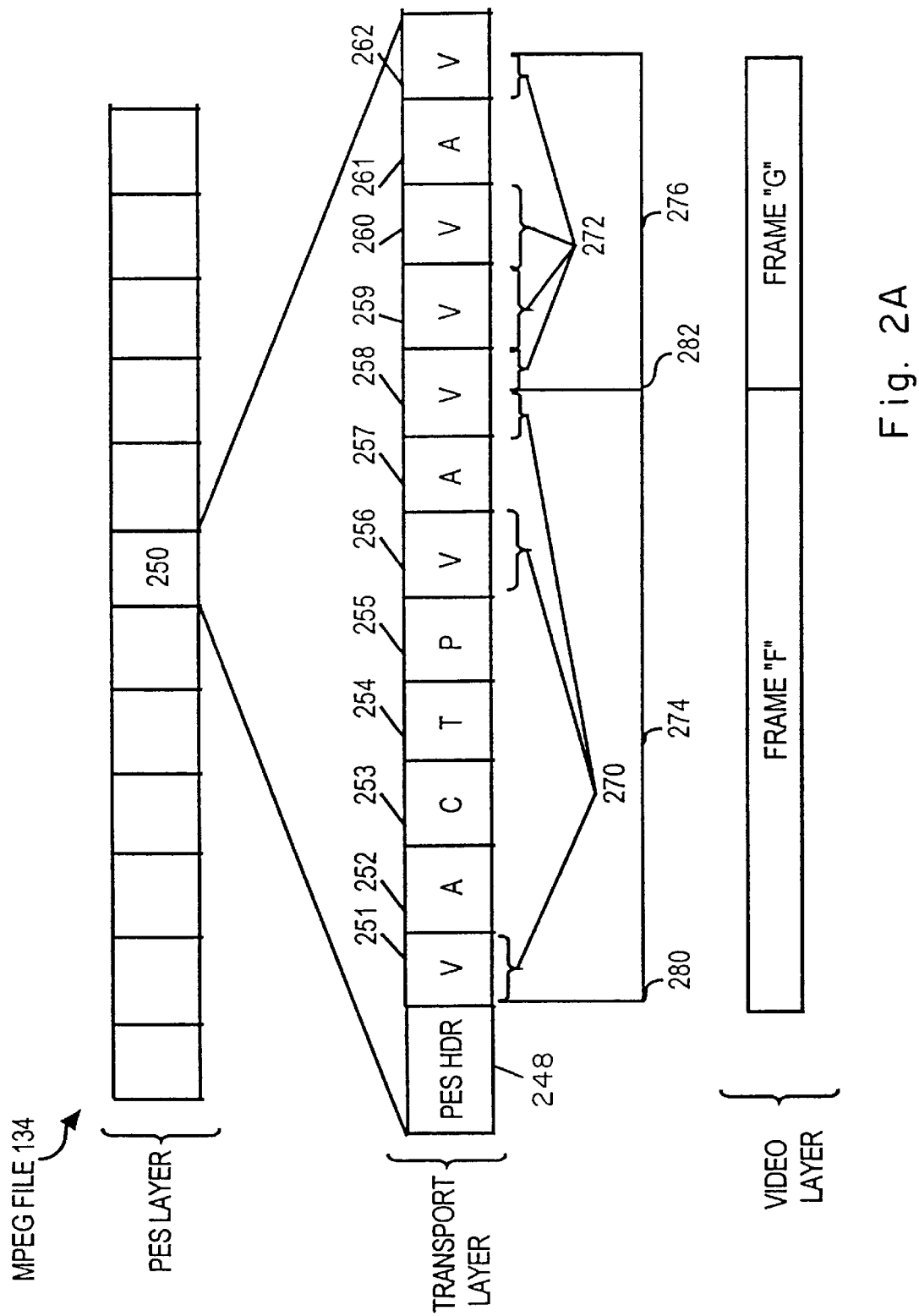
FIG. 2A is a block diagram that illustrates the format of an MPEG file.

Referring to FIG. 2a, it illustrates the structure of an MPEG-2 transport file 134 in greater detail. The data within MPEG file 134 is packaged into three layers: a program elementary stream ("PES") layer, a transport layer, and a video layer. These layers are described in detail in the MPEG-2 specifications. At the PES layer, MPEG file 134 consists of a sequence of PES packets. At the transport layer, the MPEG file 134 consists of a sequence of transport packets. At the video layer, MPEG file 134 consists of a sequence of picture packets. Each picture packet contains the data for one frame of video.

Each PES packet has a header that identifies the length and contents of the PES packet. In the illustrated example, a PES packet 250 contains a header 248 followed by a sequence of transport packets 251–262. PES packet boundaries coincide with valid transport packet boundaries. Each transport packet contains exclusively one type of data. In the illustrated example, transport packets 251, 256, 258, 259, 260 and 262 contain video data. Transport packets 252, 257 and 261 contain audio data. Transport packet 253 contains control data. Transport packet 254 contains timing data. Transport packet 255 is a padding packet.

Each transport packet has a header. The header includes a program ID ("PID") for the packet. Packets assigned PID 0 are control packets. For example, packet 253 may be assigned PID 0. Other packets, including other control packets, are referenced in the PID 0 packets. Specifically, PID 0 control packets include tables that indicate the packet types of the packets that immediately follow the PID 0 control packets. For all packets which are not PID 0 control packets, the headers contain PIDs which serve as a pointers into the table contained in the PID 0 control packet that most immediately preceded the packets. For example, the type of data contained in a packet with a PID 100 would be determined by inspecting the entry associated with PID 100 in the table of the PID 0 control packet that most recently preceded the packet.

In the video layer, the MPEG file 134 is divided according to the boundaries of frame data. As mentioned above, there in no correlation between the boundaries of the data that represent video frames and the transport packet boundaries. In the illustrated example, the frame data for one video frame "F" is located as indicated by brackets 270. Specifically, the frame data for frame "F" is located from a point 280 within video packet 251 to the end of video packet 251, in video packet 256, and from the beginning of video packet 258 to a point 282 within video packet 258. Therefore, points 280 and 282 represent the boundaries for the picture packet for frame "F". The frame data for a second video frame "G" is located as indicated by brackets 272. The boundaries for the picture packet for frame "G" are indicated by bracket 276.

Structures analogous to those described above for MPEG-2 transport streams also exist in other digital audio-visual storage formats, including MPEG-1, Quicktime, AVI, Proshare and H.261 formats. In the preferred embodiment, indicators of video access points, time stamps, file locations, etc. are stored such that multiple digital audio-visual storage formats can be accessed by the same server to simultaneously serve different clients from a wide variety of storage formats. Preferably, all of the format specific information and techniques are incorporated in the tag generator and the stream server. All of the other elements of the server are format independent.

EXEMPLARY TAG FILE

Figure 2B:
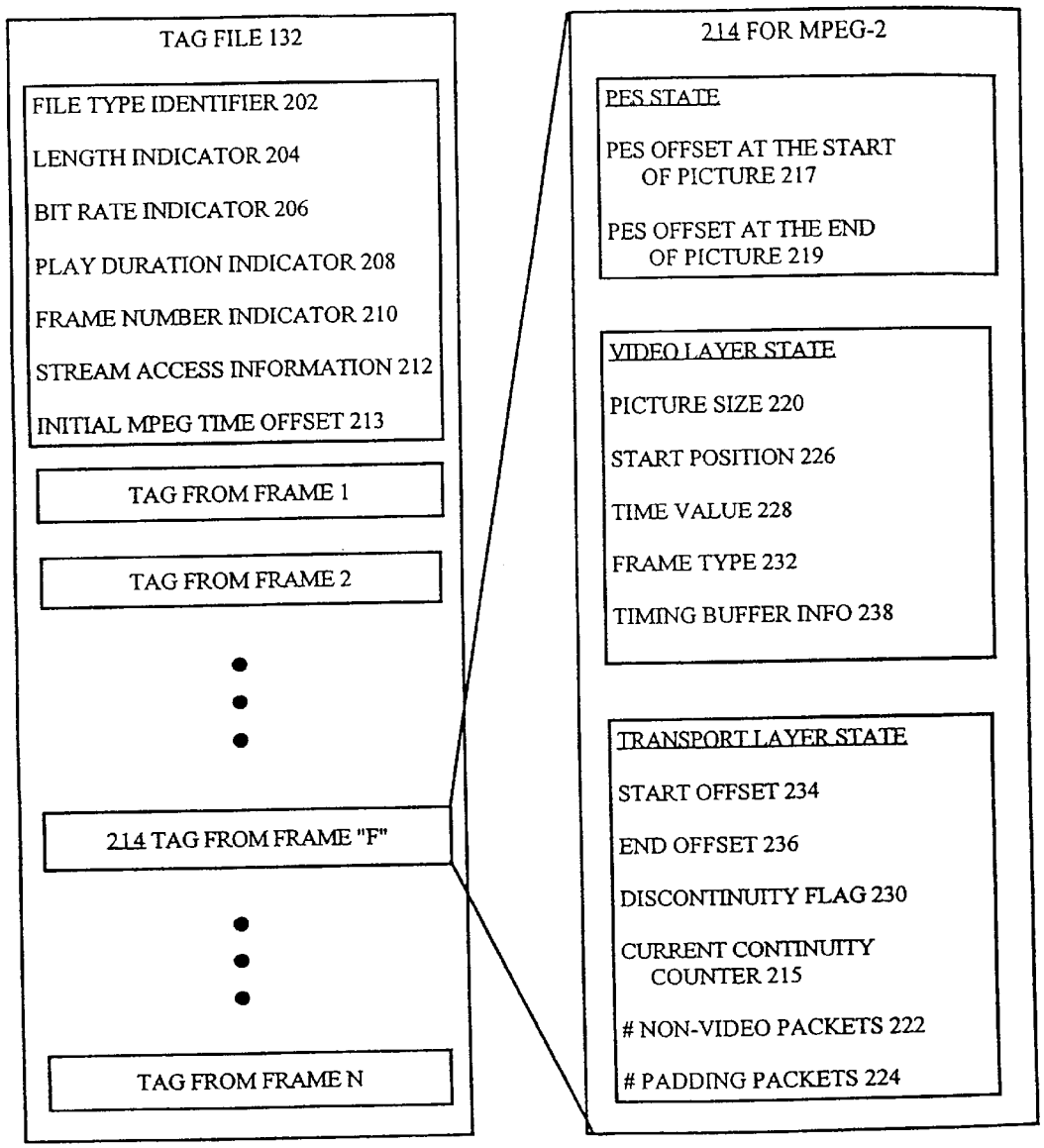
FIG. 2B is a block diagram of an exemplary tag file according to an embodiment of the invention.

The contents of an exemplary tag file 132 shall now be described with reference to FIG. 2b. In FIG. 2b, the tag file 132 includes a file type identifier 202, a length indicator 204, a bit rate indicator 206, a play duration indicator 208, a frame number indicator 210, stream access information 212 and an initial MPEG time offset 213. File type identifier 202 indicates the physical wrapping on the MPEG file 134. For example, file type identifier 202 would indicate whether MPEG file 134 is a MPEG-2 or an MPEG-1 file.

Length indicator 204 indicates the length of the MPEG file 134. Bit rate indicator 206 indicates the bit rate at which the contents of the MPEG file 134 should be sent to a client during playback. The play duration indicator 208 specifies, in milliseconds, the amount of time required to play back the entire contents of MPEG file 134 during a normal playback operation. Frame number indicator 210 indicates the total number of frames represented in MPEG file 134.

Stream access information 212 is information required to access the video and audio streams stored within MPEG file 134. Stream access information 212 includes a video elementary stream ID and an audio elementary stream ID. For MPEG-2 files, stream access information 212 also includes a video PID and an audio PID. The tag file header may also contain other information that may be used to implement other features.

In addition to the general information described above, the tag file 132 contains an entry for each frame within the MPEG file 134. The entry for a video frame includes information about the state of the various MPEG layers relative to the position of the data that represents the frame. For an MPEG-2 file, each entry includes the state of the MPEG-2 transport state machine, the state of the program elementary stream state machine and the state of the video state machine. For an MPEG-1 file, each entry includes the current state of the Pack system MPEG stream and the state of the video state machine.

Tag file entry 214 illustrates in greater detail the tag information that is stored for an individual MPEG-2 video frame "F". With respect to the state of the program elementary stream state machine, the tag entry 214 includes the information indicated in Table 1.

TABLE 1

| DATA | MEANING |
| --- | --- |
| PES OFFSET AT THE START OF PICTURE 217 | The offset, within the PES packet that contains the frame data for frame "F" of the first byte of the frame data for frame "F". |
| PES OFFSET AT THE END OF PICTURE 219 | The offset between the last byte in the frame data for frame "F" and the end of the PES packet in which the frame data for frame "F" resides. |

With respect to the state of the video state machine, tag entry 214 includes the information indicated in Table 2.

TABLE 2

| DATA | MEANING |
| --- | --- |
| PICTURE SIZE 220 | The size of the picture packet for frame "F". |
| START POSITION 226 | The location within the MPEG file of the first byte of the data that corresponds to frame "F" |
| TIME VALUE 228 | The time, relative to the beginning of the movie, when frame "F" would be displayed during a normal playback of MPEG file 134. |
| FRAME TYPE 232 | The technique used to encode the frame (e.g. I-frarne, P-frame or B-frame). |
| TIMING BUFFER INFORMATION 238 | Indicates how full the buffer of the decoder is (sent to the decoder to determine when information should be moved out of the buffer in order to receive newly arriving information). |

With respect to the state of the transport layer state machine, tag entry 214 includes the information indicated in Table 3.

TABLE 3

| DATA | MEANING |
| --- | --- |
| START OFFSET 234 | The distance between the of the first byte in the frame data and the start of the transport packet in which the first byte resides. |
| # OF NON-VIDEO PACKETS 222 | The number of non-video packets (i.e. audio packets, padding packets, control packets and timing packets) that are located within the picture packet for frame "F". |
| # OF PADDING PACKETS 224 | The number of padding packets that are located within the picture packet for frame "F". |
| END OFFSET 236 | The distance between the last byte in the frame data and the end of the packet in which the last byte resides. |
| CURRENT CONTINUITY COUNTER 215 | The Continuity value associated with frame "F". |
| DISCONTINUITY FLAG 230 | Indicates whether there is a discontinuity in time between frame "F" and the frame represented in the previous tag entry. |

Assume, for example, that entry 214 is for the frame "F" of FIG. 2b. The size 220 associated with frame "F" would be the bits encompassed by bracket 274. The number 222 of non-video packets would be five packets 252, 253, 254, 255 and 257). The number 224 of padding packets would be one (packet 255). The start position 226 would be the distance between the beginning of MPEG file 134 and point 280. The start offset 234 would be the distance between the start of packet 251 and point 280. The end offset 236 would be the distance between point 282 and the end of packet 258.

Figure 2C:
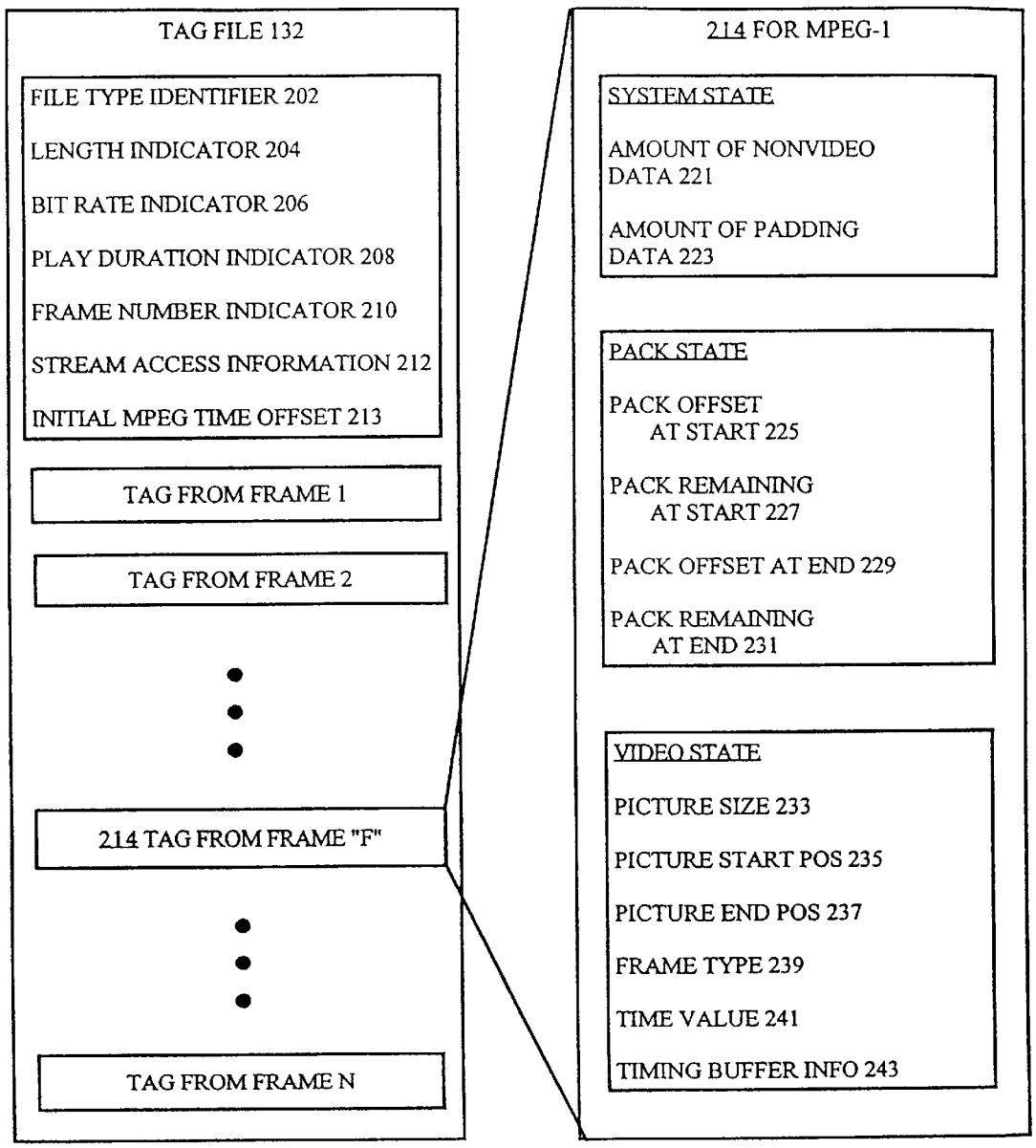
FIG. 2C is a block diagram illustrating the tag information generated for each frame in an MPEG-1 file according to an embodiment of the invention.

The tag information generated for each frame in an MPEG-1 file is illustrated in FIG. 2c. Referring to FIG. 2c, entry 214 includes data indicating the state of three state machines: a system state machine, a pack state machine, and a video state machine. Specifically, tag entry 214 includes the information shown in Table 4.

TABLE 4

| DATA | MEANING |
| --- | --- |
| AMOUNT OF NON-VIDEO DATA 221 | The amount of non-video data (in bytes) contained within the start and end boundaries of the frame data for frame "F". |
| AMOUNT OF PADDING DATA 223 | The amount of padding data (in bytes) contained within the start and end boundaries of the frame data for frame "F". |
| PACK OFFSET AT START 225 | The offset between the start boundary of the frame data for frame "F" in the beginning of the pack packet that contains the start boundary for frame "F". |
| PACK REMAINING AT START 227 | The distance between the start boundary for frame "F" and the end of the pack packet that contains the start boundary of frame "F". |
| PACK OFFSET AT END 229 | The offset between the end boundary for frame "F" in the beginning of the packet that contains the end boundary for frame "F". |
| PACK REMAINING AT END 231 | The distance between the end boundary for frame "F" and the end of the pack packet that contains the end boundary of frame "F". |
| PICTURE SIZE 233 | The distance (in bytes) between the start boundary for frame "F" and the end boundary for frame "F". |
| PICTURE START POS 235 | The distance between the start of the MPEG-1 file and the start boundary for frame "F". |
| PICTURE END POS 237 | The position, relative to the beginning of the MPEG-1 file, of the end boundary for frame "F". |
| FRAME TYPE 239 | The technique used to encode the data that represents frame "F". |
| TIME VALUE 241 | The time, relative to the beginning of the movie, when frame "F" would be displayed during a normal playback of MPEG file 134. |
| TIMING BUFFER INFO 243 | Indicates how full the decoder is (sent to the decoder to determine when information should be moved out of the buffer in order to receive newly arriving information). |

The tag information includes data indicating the state of the relevant state machines at the beginning of video frames. However, the state machines employed by other digital audio-visual formats differ from those described above just as the state machines employed in the MPEG-1 format differ from those employed in MPEG-2. Consequently, the specific tag information stored for each frame of video will vary based on the digital audio-video format of the file to which it corresponds.

THE MDS

Figure 3A:
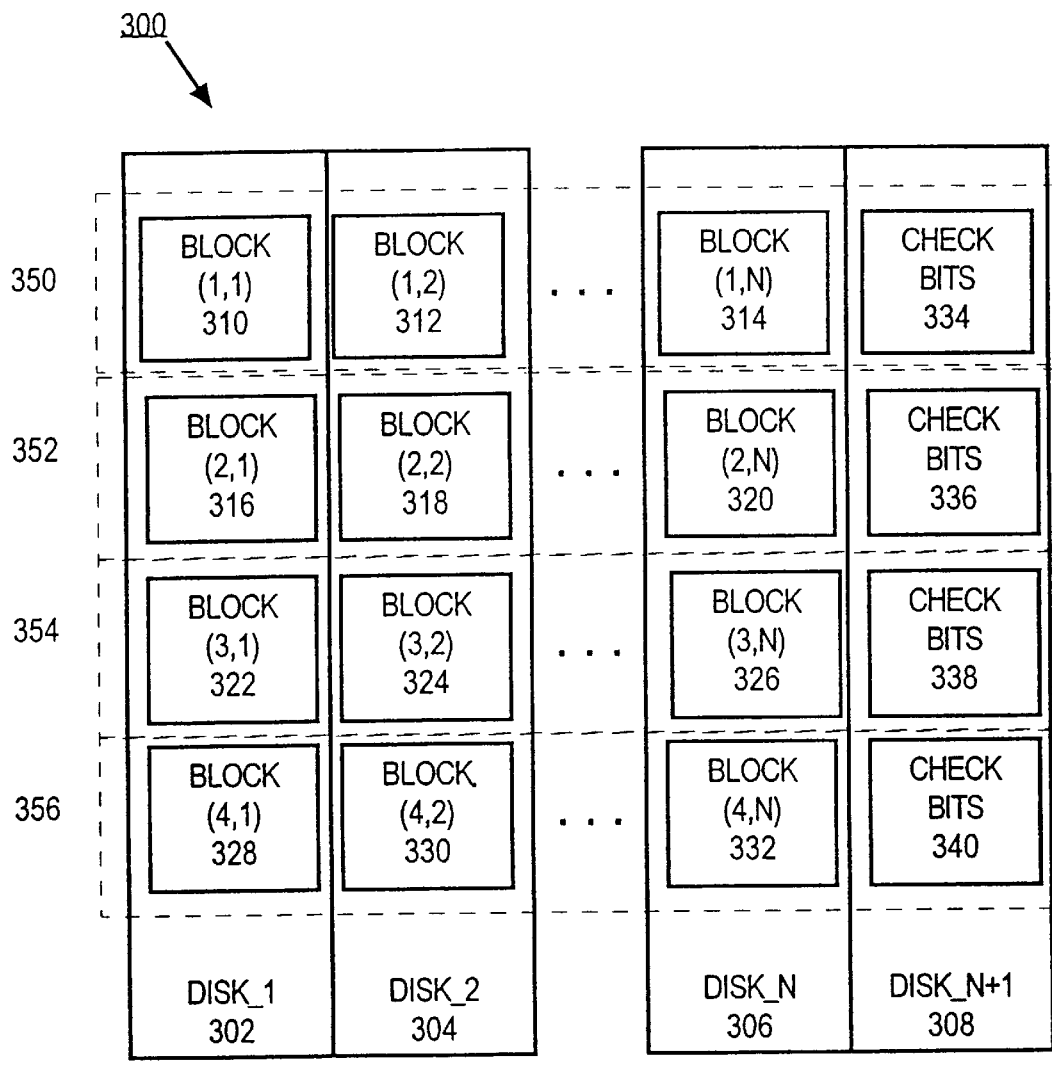
FIG. 3A is a block diagram illustrating a storage system that uses RAID error correction techniques according to an embodiment of the invention.

MDS 112 includes MDS server I110 and one or more non-volatile storage devices, such as disks 114. In the illustrated embodiment, MPEG file 134 is stored across numerous disks 114 to increase the fault tolerance of the system. Consider, for example, the multi-disk system 300 illustrated in FIG. 3. System 300 includes N+1 disk drives. An MPEG file is stored on N of the N+1 disks. The MPEG file is divided into sections 350, 352, 354 and 356. Each section is divided into N blocks, where N is the number of disks that will be used to store the MPEG file. Each disk stores one block from a given section.

In the illustrated example, the first section 350 of the MPEG file includes blocks 310, 312 and 314 stored on disks 302, 304 and 306, respectively. The second section 352 includes blocks 316, 318 and 320 stored on disks 302, 304 and 306, respectively. The third section 354 includes blocks 322, 324 and 326 stored on disks 302, 304 and 306, respectively. The fourth section 356 includes blocks 328, 330 and 332 stored on disks 302, 304 and 306, respectively.

The disk 308 which is not used to store the MPEG file is used to store check bits. Each set of check bits corresponds to a section of the MPEG file and is constructed based on the various blocks that belong to the corresponding section. For example, check bits 334 corresponds to section 350 and is generated by performing an exclusive OR operation on all of the blocks in the first section 350. Similarly, check bits 336, 338 and 340 are the products of an exclusive OR performed on all of the blocks in the section 352, 354 and 356, respectively.

System 300 has a higher fault tolerance than a single disk system in that if any disk in the system ceases to operate correctly, the contents of the bad disk can be reconstructed based on the contents of the remaining disks. For example, if disk 304 ceases to function, the contents of block 312 can be reconstructed based on the remaining blocks in section 350 and the check bits 334 associated with section 350. Similarly, block 318 can be constructed based on the remaining blocks in section 352 and the check bits 336 associated with section 352. This error detection and correction technique is generally known as "Redundant Array of Inexpensive Disks" or RAID.

During real-time playback using RAID, video pump 120 reads and processes the MPEG file on a section by section basis so that all of the information is available to reconstruct any faulty data read from disk. Techniques for performing RAID in real time are described in U.S. Pat. No. 5,623,595, entitled "METHOD AND APPARATUS FOR TRANSPARENT, REAL TIME RECONSTRUCTION OF CORRUPTED DATA IN A REDUNDANT ARRAY DATA STORAGE SYSTEM", the contents of which is incorporated herein by this reference.

During normal playback operations, there is sufficient time to perform the disk accesses required to read an entire section while the data from the previous section is being transmitted in the MPEG data stream. However, during fast forward and fast rewind operations, less than all of the data in any section will be sent in the MPEG data stream. Because less data is sent, the transmission of the data will take less time. Consequently, less time will be available to read and process the subsequent section.

For example, assume that only one frame X from section 350 was selected for display during a fast forward operation. During the time it takes to transmit the segment for frame X, the data for the next selected frame Y is read and processed. Assume that the next frame Y is located in section 352. If the MPEG file is read and processed on a section by section basis (required for RAID), then all of the blocks in section 352 are read and processed during the transmission of the single frame X. Even if it were possible to read and process all of the blocks in section 352 in the allotted time, it may still be undesirable to do so because of the resources that would be consumed in performing the requisite disk accesses.

In light of the foregoing, video pump 120 does not use RAID during fast forward and fast rewind operations. Rather, video pump 120 reads, processes and transmits only the data indicated in the commands it receives from the stream server 118. Thus, in the example given above, only the frame data for frame Y would be read and processed during the transmission of the segment for frame X. By bypassing RAID during fast forward and fast rewind operations, disk bandwidth remains at the same level or below that used during normal playback operations.

Since RAID is not used during real-time fast forward and fast rewind operations, faulty data cannot be reconstructed during these operations. Consequently, when the video pump 120 detects that the data for a selected frame is corrupted or unavailable, the video pump 120 discards the entire segment associated with the problem frame. Thus, if the data associated with a frame cannot be sent, then the prefix and suffix data for the frame is not sent either. However, any padding packets that were to be sent along with the prefix or suffix data will still be sent.

By sending data in entire "segments", conformance with the digital audiovisual format is maintained. In one embodiment, the video pump 120 will send down padding packets to fill the line to maintain the correct presentation rate. In the preferred embodiment, this behavior is selectable by the client.

DATA STRIPING

The RAID techniques described above improve both throughput (because all data from all disks in an array are read in parallel) and reliability (due to error correction). To further increase throughput, RAID may be used in conjunction with data striping. Using data striping, segments of logically sequential data are written to multiple physical devices (or sets of physical devices) in a round-robin fashion. The amount of data stored at each storage element in the round-robin sequence is referred to as a "stripe". When each storage element in the round-robin sequence is an array of RAID disks, each segment of data is referred to as a RAID stripe.

Figure 3B:
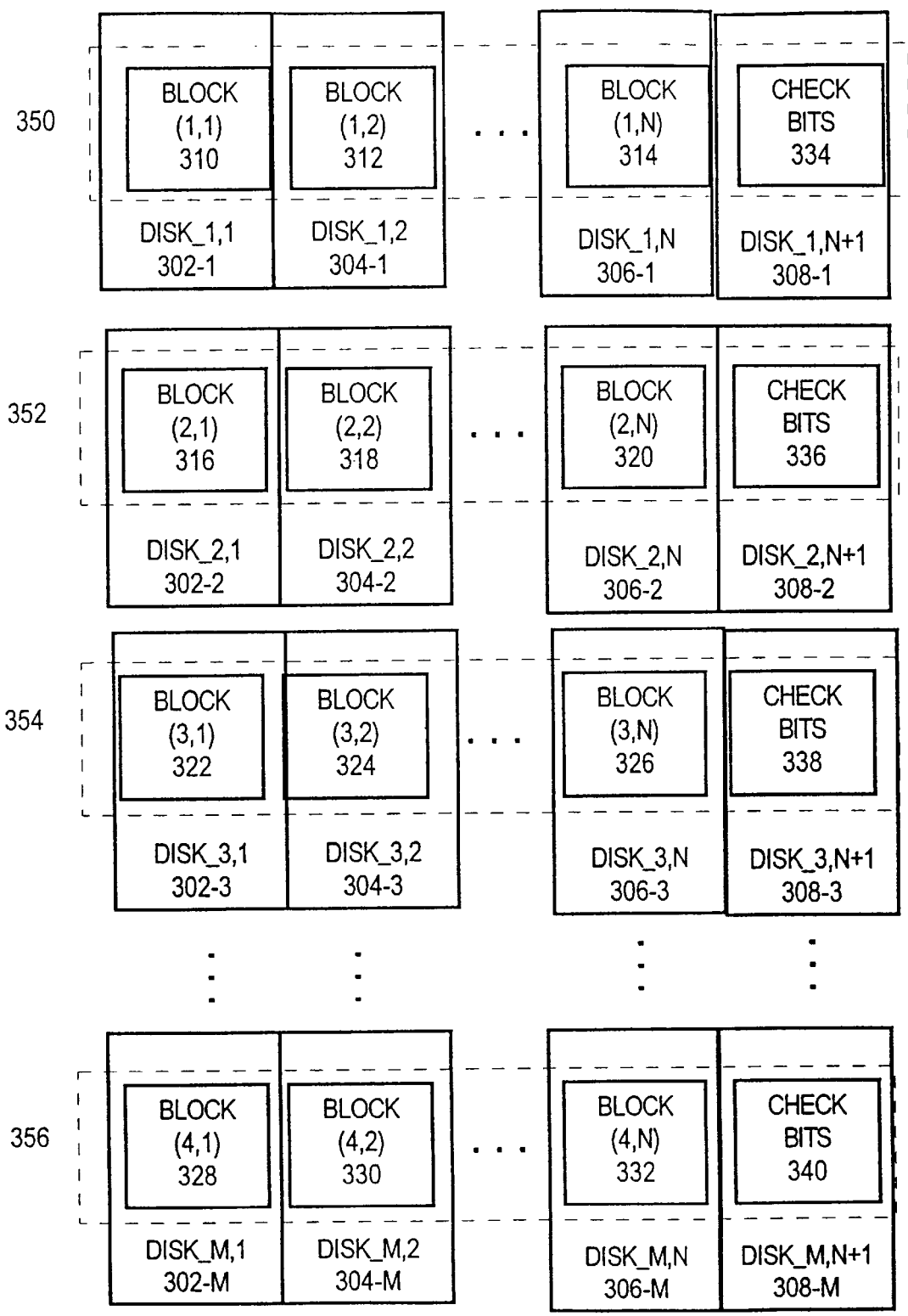
FIG. 3B is a block diagram illustrating a storage system that combines RAID error correction and disk striping according to an embodiment of the invention.

FIG. 3B illustrates a system in which data striping is used in conjunction with RAID. The system of FIG. 3B is similar to that of FIG. 3A with the exception that each of the disks in FIG. 3A has been replaced by a series of M disks. Thus, disk 302 has been replaced by disks 302-1 through 302-M. The segment portions stored on disk 302 have been stored on disks 302-1 to 302-M in a sequential, round robin fashion. For example, assume that the MPEG file has been divided into 50 segments and that disk 302 has been replaced with 25 disks. Under those circumstances, disk 302-1 would store the first portion of segments 1 and 26. Disk 302-2 would store the first portion of segments 2 and 27, etc.

Data striping increases throughput because different processes can be reading from different disk arrays in parallel. For example, one data pump may be reading the first segment of an MPEG file from the RAID array that includes Disk_1,1 through Disk_1,N+1, while another data pump is concurrently reading the second segment of the same MPEG file from the RAID array that includes Disk_2,1 through Disk_2,N+1.

For throughput performance reasons, reads and writes occur in discrete chunks, typically disk RAID stripes. In a typical digital video delivery system, each access unit is 256 kB or 2 megabits, and the content is 2 Mb/sec MPEG. Consequently, each RAID stripe corresponds to approximately one second of video, though this could easily range from about 0.2 to 10 seconds per stripe depending on content bit rate and server configuration.

THE CLIENT

Audio-visual information delivery system 100 contains one or more clients, such as client 122. Client 122 generally represents devices configured to decode audio-visual information contained in a stream of digital audio-visual data. For example, client 122 may be a set top converter boxes coupled to an output display, such as television. Client 122 includes a decoder 126 for decoding a digital data stream, and a control unit 124 for communicating information to the stream server 118.

Stream server 118 is able to receive information from client 122 over a control network 140. Control network 140 may be any network that allows communication between two or more devices. For example, control network 140 may be a high bandwidth network, an X.25 circuit or an electronic industry association (EIA) 232 (RS-232) serial line.

The client 122 communicates with the stream server 118 and database 116 via the control network 140. For example, client 122 may send a query to database 116 requesting information about what is currently available for viewing. The database 116 responds by sending the requested information back to the client 122. The user of client 122 may then select to view a particular audio-visual work beginning at a particular location and at a particular speed. Client 122 transmits requests to initiate the transmission of audio-visual data streams and control information to affect the playback of ongoing digital audio-visual transmissions through network 140 to stream server 118.

THE VIDEO PUMP AND STREAM SERVER

The video pump 120 is coupled to the stream server 118 and receives commands from the stream server 118. The video pump 120 is coupled to the disks 114 such that the video pump 120 stores and retrieves data from the disks 114.

In addition to communicating with the stream server 118, the client 122 receives information from the video pump 120 through a high bandwidth network 150. The high bandwidth network 150 may be any of type of circuit-style network link capable of transferring large amounts of data. A circuit-style network link is configured such that the destination of the data is guaranteed by the underlying network, not by the transmission protocol. For example, the high bandwidth network 150 may be an asynchronous transfer mode (ATM) circuit or a physical type of line, such as a T1 or E1 line. In addition, the high bandwidth network 150 may utilize a fiber optic cable, twisted pair conductors, coaxial cable, or a wireless communication system, such as a microwave communication system.

Network 150 may alternatively be a relatively low bandwidth network, or a combination of high bandwidth and low bandwidth communication mediums. For example, a portion of network 150 may comprise a relatively high bandwidth ATM circuit, while a relatively low bandwidth device such as a 28.8K modem is used downstream to deliver the video information from the network to the client 122.

The audio-visual information delivery system 100 permits a server, such as the video pump 120, to transfer large amounts of data from the disks 114 over the high bandwidth network 150 to the client 122 with minimal overhead. In addition, the audio-visual information delivery system 100 permits the client 122 to transmit requests to the stream server 118 using a standard network protocol via the control network 140. In a preferred embodiment, the underlying protocol for the high bandwidth network 150 and the control network 140 is the same. The stream server 118 may consist of a single computer system, or may consist of a plurality of computing devices configured as servers. Similarly, the video pump 120 may consist of a single server device, or may include a plurality of such servers.

To receive a digital audio-visual data stream from a particular digital audio-visual file, client 122 transmits a request to the stream server 118. In response to the request, the stream server 118 transmits commands to the video pump 120 to cause video pump 120 to transmit the requested digital audio-visual data stream to the client that requested the digital audio-visual data stream. For live feeds, the video server 106 will be storing the video stream into the video file 134 at the same time the video pump 120 is sending a video stream from the file 134 to the client 122.

The commands sent to the video pump 120 from the stream server 118 include control information specific to the client request. For example, the control information identifies the desired digital audio-visual file, the beginning offset of the desired data within the digital audio-visual file, and the address of the client. In order to create a valid digital audio-visual stream at the specified offset, the stream server 118 also sends "prefix data" to the video pump 120 and requests the video pump 120 to send the prefix data to the client. As shall be described in greater detail hereafter, prefix data is data that prepares the client to receive digital audio-visual data from the specified location in the digital audio-visual file.

The video pump 120, after receiving the commands and control information from the stream server 118, begins to retrieve digital audio-visual data from the specified location in the specified digital audio-visual file on the disks 114. For the purpose of explanation, it shall be assumed that audio-visual information delivery system 100 delivers audio-visual information in accordance with one or more of the MPEG formats. Consequently, video pump 120 will retrieve the audio-visual data from an MPEG file 134 on the disks 114.

The video pump 120 transmits the prefix data to the client, and then seamlessly transmits MPEG data retrieved from the disks 114 beginning at the specified location to the client. The prefix data includes a packet header which, when followed by the MPEG data located at the specified position, creates an MPEG compliant transition packet. The data that follows the first packet is retrieved sequentially from the MPEG file 134, and will therefore constitute a series of MPEG compliant packets. The video pump 120 transmits these packets to the requesting client via the high bandwidth network 150.

The requesting client receives the MPEG data stream, beginning with the prefix data. The client decodes the MPEG data stream to reproduce the audio-visual sequence represented in the MPEG data stream.

PREMATURE READ AVOIDANCE

When client 122 is playing an MPEG stream at the same time the MPEG stream is being generated by encoder 101, safeguards should be taken to ensure that client 122 does not stall (because it has reached the end of valid content data) or play bad data (because it has read beyond the end of the currently available content data). If the video pump 120 prematurely reads a stripe of disks 114, video pump 120 will send invalid data to the client 122, resulting in the display of unintended content or garbage (dirty content). Such a premature read will occur if, for example, a user requests display of a portion of the video stream that has not yet been stored on disks 114. To prevent this, end-of-file information for MPEG file 134 is maintained to indicate the current end-of-file 134. As more content data is added to file 134, the end-of-file information is updated so that the new data may be accessed.

One approach to avoid premature reads is to repeatedly update a table of contents on disks 114 with a new end-offile value, and have the video pump 120 check this value before reading stripes from disks 114. The MDS server 110 updates the end-of-file to indicate that the content file 134 includes new content only after it has been verified that the new content has been successfully stored to disks 114. Unfortunately, unless this end-of-file information is guaranteed to be held in dynamic memory, this technique leads to a jitter in the latency period of updates that is difficult to predict.

Another approach to avoid premature reads is for the MDS server 110 to actively transmit the new end-of-file information to all processes that are reading the content. Thus, MDS server 110 stores content data into file 134 on disks 114, waits for verification that the content has been stored, and then transmits messages indicating the existence of the newly stored content to all processes reading the content data (e.g. video pump 120). The MDS server 110 may make such end-of-file notification messages periodically (e.g. after every 5 seconds) or after a predetermined amount of new content data has been successfully stored (e.g. after every 1 Megabyte). Unfortunately, notification times will also jitter due to variations in the content arrival times, which is a function of the encoder 101 and the network between the encoder 101 and the video server 106.

According to one embodiment, the tag information is used to indicate the current end-of-file. Specifically, video server 106 effectively updates the end-of-file of file 134 by sending tag information from tag buffer 108 for storage by MDS 112. As soon as the tag information that corresponds to a particular portion of content has been transmitted by video server 106, the video pump 120 is free to perform a seek to that particular portion of video. Until the tag information that corresponds to a particular portion of video is released, video pump 120 may not perform a seek to the corresponding portion of video. Because the newest tag information indicates the current end-of-file, newly connected users may simply seek to the content associated with the newest tag information, and begin playing the feed at the real-time rate.

MINIMUM TAG DELAY PERIOD

To prevent client 122 from stalling or playing bad data, the transmission of tag data from tag buffer 108 to MDS 112 is delayed. Preferably, the duration of the delay is long enough to ensure that the associated content data will not be prematurely accessed. On the other hand, delaying the tag data longer than necessary increases the latency between when content is encoded and when users can seek or scan to the content. Consequently, it is desirable to determine a minimum tag delay period, and to buffer tag data in tag buffer 108 for the minimum tag delay period. The minimum tag delay period for a tag data item is determined by the maximum latency associated with delivering the corresponding content data from encoder 101 to video pump 120.

Video server 106 includes a network buffer 152 and a write buffer 154. Typically, the video server 106 will be reading content data from channel 128 into network buffer 152 at the same time that video server 106 is writing content data from write buffer 154 to disks 114. In embodiments that use RAID storage techniques, content data is received and buffered within video server 106 in units that correspond to one RAID stripe.

Video pump 120 includes a prefetch unit 146 and a buffer 144. Video pump 120 reads content data from disks 114 asynchronously. To read content data, prefetch unit 146 requests the transmission of a particular portion of content data, and disks 114 respond by either sending the requested content data or by indicating that the requested data cannot be sent. Some latency occurs between the time the prefetch unit 146 requests data, and the time the data is received by video pump 120.

When content data from file 134 arrives at video pump 120, video pump 120 stores the content data from file 134 into the buffer 144. As bandwidth becomes available on network 150, video pump 120 transmits content data from the buffer 144 over network 150 to client 122. As with the video server 106, content data is pre-fetched and buffered within video pump 120 in units that correspond to one RAID stripe when RAID storage techniques are used.

As explained above, the video pump 120 is typically copying data from one RAID stripe into network buffers and prefetching the following stripe. Likewise, the video server 106 is typically writing one RAID stripe of content to the data store and receiving data from the network into a second memory buffer. Consequently, there are typically four RAID stripes "in transit", so the latency between when any content data is generated and when it is available to be played is approximately the time it takes to deliver four RAID stripes worth of data.

RAID stripes are usually 128K bits or 256K bits per disk. The combined total of all disks in a RAID stripe is therefore 1 to 2 Megabits. For typical MPEG files, each raid stripe will correspond to approximately one second of video. Consequently, having four RAID stripes in transit results in a minimum latency of approximately 4 seconds.

The implication for tag data is that a given tag may only be released by the video server 106 for use by other entities when the corresponding content is available to be played (i.e. has been successfully stored on disk for two seconds). Therefore, in a video delivery system where the content delivery has a four second latency, the tag data retained in tag buffer 108 is transmitted no earlier than four seconds after the generation of the corresponding content.

According to one embodiment, jitter and stalling are both avoided by transmitting a batch of tag data from tag buffer 108 to MDS 112 every twelve seconds. The tag data batch transmitted at every twelve second interval includes all tag information in tag buffer 108 that is at least twelve seconds old. Tag data that is less than twelve seconds old is retained in tag buffer 108 and transmitted to MDS 112 in a batch at the end of the next twelve second interval. MDS server 110 sends the tag data to the various entities (e.g. video pump 120) that are reading video file 134, and then stores the tag information on disks 114.

DIGITAL CHANNELS

Video files generated for specific audio-visual works, such as sporting events, will be of finite length. Consequently, their corresponding content files will also consume a finite amount of storage making it practical to perpetually store the entire content file for later viewing. However, a traditional television "channel" is composed of a never-ending sequence of audio-visual works. Perpetually retaining all of the content of a digital channel would continuously consume storage at an unacceptably high rate. On the other hand, it is desirable to allow users to view programs that they may not have been able to view at the time the programs were originally broadcast. For example, it would be desirable for a viewer to have access to the last 24 hours of programming that was broadcast over a digital channel. According to an embodiment of the invention, historical viewing for an infinite feed is provided through the use of a continuous finite buffer, where older data "expires" and is overwritten with new data.

CONTENT EXPIRATION

In order to have continuous buffer of data, for instance the last 24 hours of Lifetime, Television for Women, older content needs to be deleted along with the corresponding tags. Various approaches may be used to implement such a continuous buffer.

With respect to the content data, the simplest approach to implement a continuous buffer is to create a single file large enough to hold 24 hours of footage. The file is then treated as a circular buffer. Specifically, after the creation of the initial 24 hour file, the MDS server 110 would establish the beginning of the file as the current "insertion point". The MDS server 110 would then store new content data over the old data at the insertion point, and move the insertion point to the end of the new data. When the insertion point hits the end of the file, it wraps around again to the beginning of the file.

Unfortunately, this single-file circular buffer approach makes it difficult to grow or shrink the time of the file. For example, assume that the insertion point is in the middle of the file, and a decision is made to expand the file to cover 48 hours. Under these circumstances, the MDS server 110 could not begin to extend the time covered for another 12 hours, when the insertion point would have reached the end of the file. Using the single circular buffer approach, it is also difficult to detect if a client has paused and had the "horizon" move over their position, such that when they resume the content they were watching has been overwritten.

Figure 4:
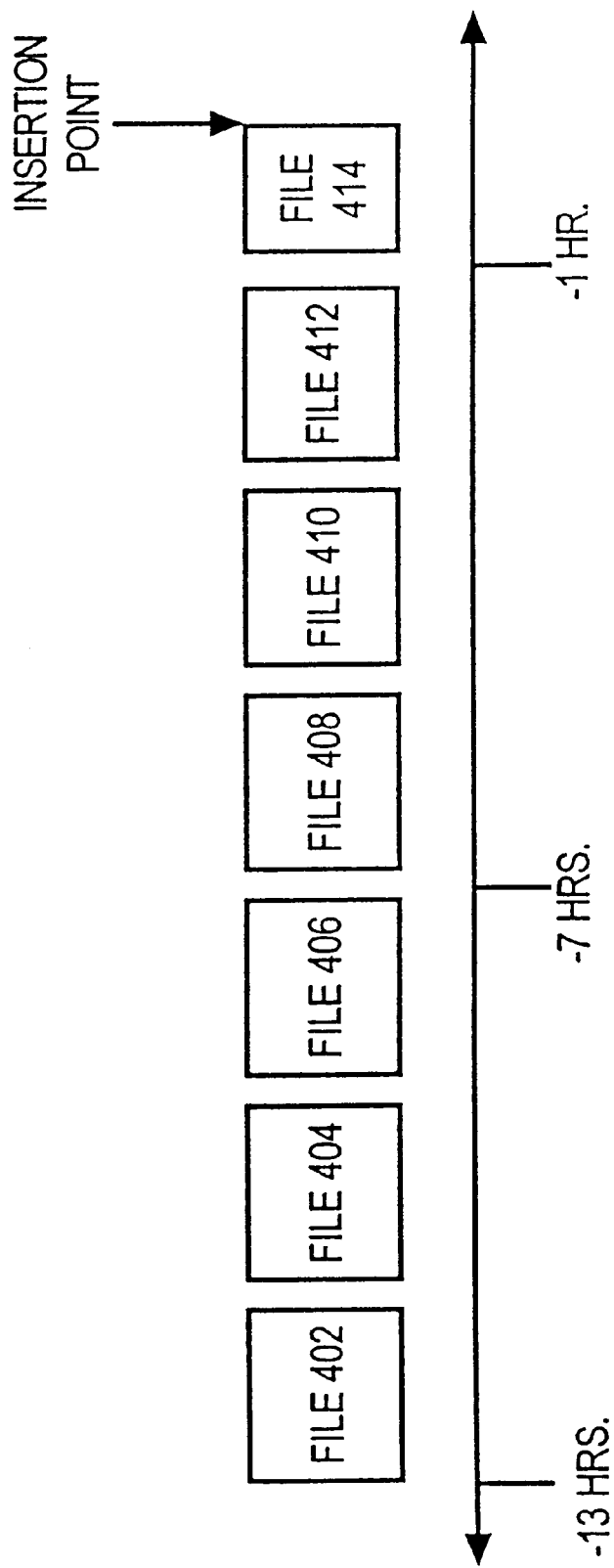
FIG. 4 is a block diagram illustrating a series of content files used to store the content of a continuous feed according to an embodiment of the invention.

FIG. 4 illustrates an alternative, more flexible approach to buffering a predetermined amount of an infinite video feed. Referring to FIG. 4, the content data is stored in a group of smaller files 402-414. Each of the smaller files stores a subset of the buffered content data. In the illustrated embodiment, each of files 402-412 store two hours worth of content. File 414 currently stores one hour of content. The current insertion point is at the end of file 414. When file 414 reaches two hours of content, file 414 will be closed and a new content file will be created. As content files age, the older content files are deleted to free up disk space for new files. During playback, files are joined together seamlessly by the video pump as the content data is sent to the client.

When the buffering technique illustrated in FIG. 4 is used, a lenient expiration policy can be set. Specifically, a policy may be established that a file is not deleted until all clients have finished with the (file and any files that precede the file). For example, assume that users are allowed to access the last 12 hours of a feed. When file 414 is completed, files 404-414 will contain the most recent 12 hours, so file 402 is no longer required. However, a client may currently be viewing the contents of file 402. Consequently, file 402 is not immediately deleted. Rather, new clients are prevented from accessing file 402, but the client currently accessing file 402 is allowed to finish playing file 402. When the last client has finished playing file 402, the file 402 is deleted.

To put a cap on the number of existing files, a time limit may be established for clients to finish playing old files. For example, when file 414 is completed, not only are new clients prevented from accessing file 402, but the clients currently accessing file 402 are given two hours to finish playing file 402. At the end of two hours, file 402 is then deleted to free up disk space without regard to whether any clients were still reading file 402.

TAG EXPIRATION

When a content file (e.g. file 402) is deleted, the tags that correspond to the deleted content file are considered "expired", and therefore can also be deleted. Ideally, tags are stored in a format, such as a database table, that allows easy deletion of old tags as well as the addition of new ones. Unfortunately, the overhead associated with storing and retrieving tags from a database table may be too expensive to be practical under live feed conditions. For ease and speed of access, therefore, tags are typically stored in a flat file.

Figure 5:
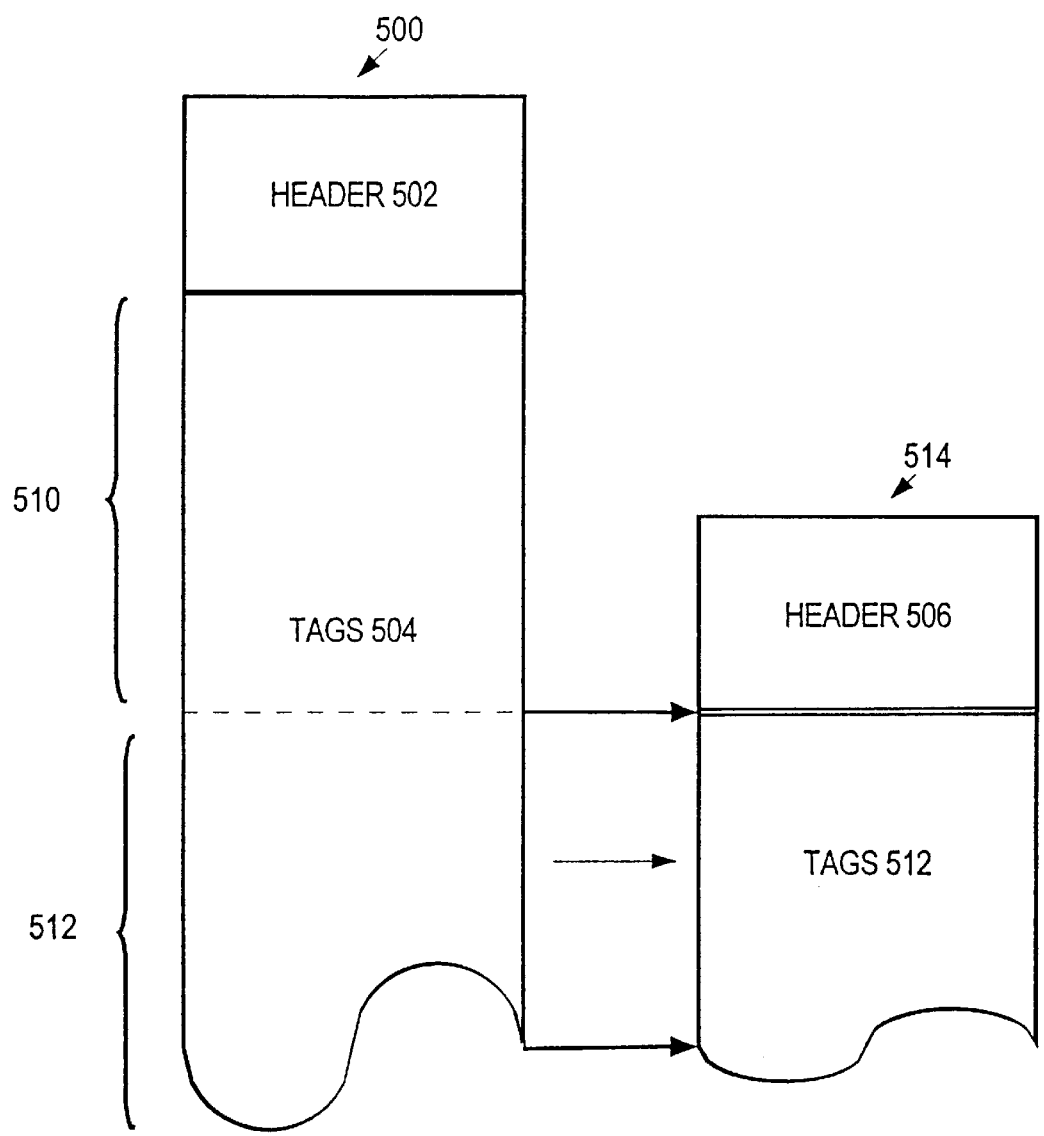
FIG. 5 is a block diagram illustrating the migration of tag information from an old tag file to a new tag file in response to the expiration of tag data within the old tag file.

Referring to FIG. 5, it illustrates a flat tag file 500. The flat tag file 500 includes a header 502 followed by a set of tags 504. The header 502 indicates information about the contents of tag file 500, including the set of content files to which the tags within tag file 500 correspond.

As new tags arrive, the tags are appended to tag file 500. Because tag file 500 is associated with a continuous feed, tag file 500 will grow indefinitely unless a mechanism is provided for deleting expired tags. However, tag file 500 itself should remain valid even after the expiration of some tags (e.g. tags 510) within the tag file 500, since clients may continue to access and use the tags 512 within tag file 500 that have not yet expired. Therefore, the expiration mechanism cannot simply delete the expired tags 510 from the tag file 500.

Rather than directly delete the expired tags from within tag file 500, a temporary tag file 514 is created by constructing a new header 506 and appending to the new header 506 a copy of the unexpired tags 512 from the old tag file 500. The new header 506 includes the same information as the old header 502, except that data within header 502 indicates that tag file 500 includes tags for the deleted content file, while data within header 506 does not.

While new tag file 514 is being created, new tag data is appended to both the new tag file 514 and the old tag file 500. After the new tag file 514 is created, new tag data is appended to the new tag file 514 rather than the old tag file 500. To ensure that the new tag data is appended after tag data 512, storage for the to-be-copied tags 512 is preallocated in the new tag file 514, and the new tags are appended after the preallocated storage while the existing tags 512 are copied into the preallocated storage.

When all of the unexpired tags 512 have been copied to the new tag file 514, the old tag file 500 is closed and the new tag file 514 is renamed over the top of the old tag file 500. After the new tag file 514 has been renamed, the tag file readers (e.g. stream server 118) that were using the old tag file 500 are reset based on the information contained in the header of the new tag file 514. According to one embodiment (the "push model"), messages are sent to the tag file readers to expressly inform them that the tag file has been modified, and that they should update themselves based on header information in the new tag file 514.

According to an alternative "pull model" embodiment, the tag file readers are not expressly informed. Rather, they are configured to read and update themselves based on the header information of the new tag file if they ever fail in an attempt to read a tag. The pull model approach has the benefit that it avoids the transmission of messages which, under many circumstances, are not necessary.

When tags associated with a particular content segment are deleted, clients may continue to view the content segment. However, the clients will not be able to perform non-sequential access operations that require the deleted tag information, such as fast forward and rewind.

TIMESTAMPING

Tag information includes timestamp information for each of the frames in the corresponding content data. For the purposes of decoding, the timestamp information typically represents time relative to the beginning of a feed (i.e. the "presentation time"), and is mapped to the byte offset in the content file of the frame that corresponds to that presentation time. However, for continuous feeds, such relative time values are not meaningful. For example, a user would want to request playback beginning at Jan. 21, 1997 16:30:23, rather than beginning at 5,345,789.76 seconds from the time a station began broadcasting.

According to one embodiment of the invention, absolute time values are supported by storing an absolute time value that corresponds to the "zero" relative time value. Therefore, when a client specifies playback from an absolute time, the absolute time value associated with "zero" is subtracted from the specified absolute time value to yield a relative time value. The relative time value is then used by stream server 118 to identify the appropriate tag information, and the tag information is used by stream server 118 to cause video pump 120 to begin sending content from the appropriate location in the content file 134.

Typically, the transport formats of digital video provide a fixed number of bits (e.g. 33 bits) to represent timestamps. For continuous feed environments, the relative timestamp values will inevitably reach numbers that cannot be represented by the number of bits available in the transport format. When this occurs, the timestamp values "wrap" and begin again at zero.

To address the wrapping problem, a higher-precision wrap value (e.g. 64 bits) is maintained. When performing a seek or other non-sequential access, the stream server 118 uses the higher-precision timestamp values. When transmitting content to a client, the video pump 120 sends the lower-precision timestamps.

The video encoding and delivery techniques described herein empower users with control of functions that were previously in the exclusive domain of program providers. For example, program providers currently determine which plays of a SuperBowl will be replayed to viewers, the speed at which they will be replayed, and how many times they will be replayed.

However, viewers may have strongly differing opinions as to which plays merit multiple viewings. For example, two viewers may dispute the accuracy of a particular call. However, the program provider may not consider the play that gave rise to the call to be significant enough to replay the play. Using the techniques provided herein, viewers may determine for themselves which plays should be immediately replayed, at what speed they are replayed, and how many times they are replayed.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for storing a continuous feed of video, the method comprising the steps of:
receiving a digital data stream produced by encoding said continuous feed in a digital video format;
creating a series of content files by repeatedly performing the steps of:
storing said digital data stream in a current file; and
establishing a new file as said current file when said current file satisfies a predetermined condition;
if said series of content files contains more than a predetermined amount of said continuous feed, then deleting an oldest content file in said series of content files.

2. The method of claim 1 further comprising the steps of:
determining whether any reader is currently playing information from said oldest content file, and
delaying the step of deleting if a reader is currently playing information from
said oldest content file.

3. The method of claim 2 wherein the step of delaying is performed by delaying the step of deleting until either:
a predetermined period of time has elapsed; or
no readers are currently playing information from said oldest content file.

4. The method of claim 1 wherein, if said series of content files contains more than a predetermined amount of said continuous feed, then preventing new readers from beginning to access data from said oldest content file in said series of content files.

5. The method of claim 1 wherein the step of establishing a new file as said current file when said current file satisfies a predetermined condition includes the step of establishing a new file as said current file when said current file contains a second predetermined amount of said continuous feed.

6. The method of claim 1 further comprising the step of generating and storing tag information that indicates information about frames contained in said digital data stream.

7. The method of claim 6 wherein the step of storing tag information includes the steps of:
generating a first header for a first tag file;
storing tag information sequentially in said first tag file;
when a set of tags within said first tag file becomes invalid, performing the steps of
generating a second header for a second tag file;
copying all tags in said first tag file, except said set of tags, from said first tag file to said second tag file;
storing new tag information sequentially within said second tag file; and
deleting said first tag file.

8. The method of claim 7 wherein the step of deleting said first tag file comprises the step of renaming said second tag file over said first tag file.

9. A method for providing non-sequential access to video from a continuous feed, the method comprising the steps of:
receiving a digital data stream produced by encoding said continuous feed in a digital video format;
generating tag information that indicates information about frames contained in said digital data stream, said tag information including timestamps that indicate timing of frames relative to a beginning of said digital data stream;
storing an initial time value that indicates an absolute time that corresponds to said beginning of said digital data stream;
receiving a request from a client for playback beginning at a specified absolute time;
subtracting said initial time value from said specified absolute time to determine a relative time;
using said tag information to identify a location in said digital data stream that corresponds to said relative time; and
transmitting said digital data stream to said client beginning at said location in said digital data stream that corresponds to said relative time.

10. The method of claim 9 wherein:

said digital data stream includes timestamp values having a first precision; and said step of generating tag information includes generating timestamp values that have a second precision, wherein said second precision is higher than said first precision.

11. A computer-readable medium having stored thereon sequences of instructions for storing a continuous feed of video, the sequences of instructions comprising instructions for performing the steps of:

receiving a digital data stream produced by encoding said continuous feed in a digital video format;

creating a series of content files by repeatedly performing the steps of:
storing said digital data stream in a current file; and
establishing a new file as said current file when said current file satisfies a predetermined condition;

if said series of content files contains more than a predetermined amount of said continuous feed, then deleting an oldest content file in said series of content files.

12. The computer-readable medium of claim 11 further comprising sequences of instructions for performing the steps of:

determining whether any reader is currently playing information from said oldest content file, and delaying the step of deleting if a reader is currently playing information from said oldest content file.

13. The computer-readable medium of claim 12 wherein the step of delaying is performed by delaying the step of deleting until either:

a predetermined period of time has elapsed; or no readers are currently playing information from said oldest content file.

14. The computer-readable medium of claim 11 wherein, if said series of content files contains more than a predetermined amount of said continuous feed, then preventing new readers from beginning to access data from said oldest content file in said series of content files.

15. The computer-readable medium of claim 11 wherein the step of establishing a new file as said current file when said current file satisfies a predetermined condition includes the step of establishing a new file as said current file when said current file contains a second predetermined amount of said continuous feed.

16. The computer-readable medium of claim 11 further comprising sequences of instructions for performing the step of generating and storing tag information that indicates information about frames contained in said digital data stream.

17. The computer-readable medium of claim 16 wherein the step of storing tag information includes the steps of:

generating a first header for a first tag file;

storing tag information sequentially in said first tag file;

when a set of tags within said first tag file becomes invalid, performing the steps of generating a second header for a second tag file;

copying all tags in said first tag file, except said set of tags, from said first tag file to said second tag file;

storing new tag information sequentially within said second tag file; and deleting said first tag file.

18. The computer-readable medium of claim 17 wherein the step of deleting said first tag file comprises the step of renaming said second tag file over said first tag file.

19. A system for delivering a continuous feed of video, the system comprising:

one or more storage devices;

a video server that stores said continuous feed of video in a series of files on said one or more storage devices;

a threshold detection mechanism configured to detect when said series of files holds more than a predetermined threshold amount of said continuous feed; and an expiration mechanism that deletes an oldest file of said series of files in response to said threshold detection mechanism detecting that said series of files holds more than said predetermined threshold amount of said continuous feed.

20. The system of claim 19 further comprising a detection mechanism configured to detect whether any reader is currently accessing said oldest file, wherein said expiration mechanism is configured to delay deletion of said oldest file if any reader is currently accessing said oldest file.

* * * * *